United States Patent Office 3,243,306
Patented Mar. 29, 1966

3,243,306
REFRACTORY AND PROCESS OF MAKING
Frank F. Raine, Mexico, Mo., assignor to Kaiser Aluminum & Chemical Corporation, Oakland, Calif., a corporation of Delaware
No Drawing. Filed Nov. 26, 1963, Ser. No. 326,228
24 Claims. (Cl. 106—65)

This invention concerns refractories, particularly acid or alumino-silica refractories, and methods of making such refractories.

It has been recognized in the art of acid or fireclay refractories (i.e., those based on naturally occurring alumino-silicate materials) that generally, other things being equal the higher the alumina ($Al_2O_3$) content of a fireclay the greater its refractoriness (that is, the higher the temperature it can withstand before softening and slumping). It has also been known to add to plastic clay, for example, plastic fireclay, other non-plastic materials with a higher content of $Al_2O_3$, for example flint clay, diaspore, bauxite, and even relatively pure aluminum oxide. In general, this results in a final product of increased refractoriness. However, if more than a certain proportion of such non-plastic materials are included in the refractory mix (along with the plastic clay), it becomes impossible to form such mixes into shapes by plastic forming operations (as, for example, by extruding) without getting excessive cracking and breakage in the forming, drying, and firing operations. Accordingly, it has been the practice to form the so-called high alumina refractories (that is, those alumino-silica refractories which have, after firing, an $Al_2O_3$ content of over 47.5%) by a non-plastic forming method, for example by pressing. Unfortunately, however, it is not possible to achieve by non-plastic forming methods as low a porosity in the fired product as is obtainable with a plastic forming operation such as the extrusion or stiff mud process. Thus, prior art high alumina refractories of the alumino-silica class show, after firing, porosities of at least about 18% by volume and generally between 20% and 30% by volume or even higher. On the other hand, fired refractory shapes made by the plastic stiff mud or extrusion process typically have porosities as low as 10% or less.

In the stiff mud or extrusion process, a clay containing composition is mixed with from about 10% to about 20% water to form a plastic mass and extruded or forced out through an opening in a die. The die opening forms the cross-sectional dimensions of the brick or other shape being made, the third dimension being obtained by cutting the extruded column to the desired size. The extruded shape can be dried and fired after being cut to size, but very often it will be subjected to a "repress" operation before drying. In the repress operation, the roughly formed shapes are subjected to a relatively low pressure (e.g., from about 250 to about 350 lbs. per square inch) in a press with a mold of the desired size and form of the brick or other shape. This repress operation has the effect of giving sharper and truer shape and dimensions to the brick.

It has now been found that a high alumina refractory (i.e., one in which the $Al_2O_3$ content in the fired refractory is at least 47.5% and one in which, generally, high alumina material has been added to fireclay) can be formed in a plastic molding operation by preparing a mix consisting essentially of at least 30%, and preferably between 30% and 40%, of a plastic or bonding fireclay, at least 10%, and preferably between 10% and 20%, of a calcined aluminous material containing at least 70% $Al_2O_3$, said aluminous material being in a pulverized state, the balance of the mix (on the basis of dry ingredients) being flint clay, at least 5% of the mix and preferably at least 20% of the mix being lightly calcined flint clay. It is preferred that at least 40% and preferably about half of the flint clay in the mix be lightly calcined.

Mixtures according to this invention are particularly suitable for making alumino-silica brick of the class known as 50% alumina brick, such brick containing, in the fired condition, from 47.5% to 52.5% $Al_2O_3$. When it is desired to make such 50% alumina brick, mixtures according to this invention will contain from about 30% to about 40% plastic fireclay, from about 10% to about 20% of pulverized aluminous material containing at least 70% $Al_2O_3$, from about 20% to about 30% raw flint clay and from about 20% to about 30% of lightly calcined flint clay.

In referring to an alumino-silica refractory of over 47.5% $Al_2O_3$, or from 47.5% to 52.5% $Al_2O_3$, it will be understood that the major portion of the balance of the composition of the fired refractory is $SiO_2$, the remainder being normal impurities. Preferably these impurities will not exceed 10% of the weight of the refractory and, accordingly, a fired refractory containing from 47.5% to 52.5% $Al_2O_3$ will preferably contain from 42.5% to 47.5% $SiO_2$.

The plastic fireclay or bond clay used in this invention may be any of various naturally occurring plastic fireclays. In general, it will be advantageous to choose a clay with relatively high $Al_2O_3$ content, commensurate with obtaining the desired plasticity in the mixture. While for economic reasons a naturally occurring fireclay will generally be preferred as the plastic or bond clay, it will be understood that the purer, often purified or beneficiated, clays known as kaolins and the like can be used.

The aluminous material used in this invention can be, for example, calcined bauxite or a calcined alumina produced by the Bayer process, and will have a low ignition loss, for example less than 1%. In any case, the aluminous material will contain at least 70% $Al_2O_3$ and will preferably have an $Al_2O_3$ content above 85%. The aluminous material is used in the pulverized condition; that is, it substantially all passes a 28 mesh screen and the major portion of it passes a 200 mesh screen.

The raw flint clay used in this invention can be any of various naturally occurring flint clays and can, if desired, show a slight amount of plasticity. The amount of a particular type of flint clay chosen will depend on achieving the desired balance of workability and refractoriness in the mixture. The raw flint clay will be of relatively coarse size, preferably substantially all passing a 5 mesh screen with the major portion being retained on a 28 mesh screen.

The lightly calcined flint clay may be made from any of, or even a mixture of, naturally occurring flint clays. The light calcination is carried out at a temperature and for a time such that the ignition loss of the clay, which is typically from about 12% to about 14% in the raw clay, is reduced to from about 2% to about 5%. This ignition loss will largely be in the form of $H_2O$ from decomposition of the clay minerals. The light calcination will be at a temperature at which little, if any, shrinkage of the clay has occurred. While the temperature of light calcination will depend on the particular clay used, generally it will lie between about 400° C. and about 900° C. The lightly calcined flint clay is also preferably used in the mixture of this invention in a relatively coarse state, for example all passing a 6 mesh screen and the major portion retained on a 28 mesh screen.

In practicing this invention, the dry ingredients are mixed, in a pug mill or other mixing device, with a tempering amount of water (generally from about 12% to about 18%) sufficient to make a plastic mass. If desired, a liquid binder, for example waste sulfite liquor, can be added. The plastic mass is formed into shape in the plastic state, for example by extrusion through a die opening to form a continuous column of the desired cross section. This column is cut to form blocks of the desired size. As mentioned above, these blocks can be dried and fired directly or can be subject to a repress operation. After drying, the formed blocks are subjected to firing, the time and temperature of which depend on the chemical composition of the mixture. Thus, for example, a refractory having a total aluminum oxide content of about 50% in the fired state would preferably be fired to from about cone 14 to about cone 16.

Brick or other shapes made by the method of this invention show a porosity of less than 15%, usually about 10% or less. This is to be compared with the porosities of prior art brick of similar chemical composition (i.e., $Al_2O_3$ content) which are from about 18% to 25% or more.

As a specific example of the practice of this invention, a mix of the following composition:

| | Percent |
|---|---|
| Stoltz top (plastic clay) | 35 |
| Calcined flint | 26 |
| Niewald flint clay | 24 |
| Pulverized calcined bauxite | 15 | was mixed in a pug mill with about 1% of the weight of dry ingredients of lignin binder and sufficient water, about 15% of the weight of the dry ingredients, to form an extrudable mass. The Stoltz clay is a semi-plastic bond clay mined near Fulton, Missouri. It has an $Al_2O_3$ content of about 35%, and $SiO_2$ content of about 47%, and ignition loss of about 13%, the balance being normal impurities. As used in this example, the clay all passed an 8 mesh screen, and 74% of it was retained on a 65 mesh screen. The Niewald caly is a hard flint clay mined south of the Missouri River in Missouir. It has an $Al_2O_3$ content of about 39%, an $SiO_2$ content of about 43%, and ignition loss of about 14%, the balance being normal impurities. As used in this example, the clay substantially all passed a 5 mesh screen and 58% of it was retained on a 28 mesh screen. The calcined flint clay had an analysis, before calcining, similar to that of the Niewald clay. After calcination, it had an ignition loss of about 4%. As used in this example, it all passed a 6 mesh screen and 70% was retained on a 28 mesh screen. The pulverized calcined bauxite has an $Al_2O_3$ content of about 89% and, in this example, all passed a 28 mesh screen with 73% passing a 200 mesh screen. The mixture was extruded and cut into blocks to form standard refractory brick of a size about 3 x 4½ x 9 inches. (It will be understood by those skilled in the art that the size of the shape as formed in greater than that of the final size desired to allow for drying and firing-shrinkage.) The extruded blocks were subjected to a repress operation and then dried. After firing to about cone 15, the brick had the following properties:

| | | |
|---|---|---|
| Bulk density | 151.9 lbs. per cubic foot. | (ASTM:C20–46). |
| Apparent porosity | 9.3% | (ASTM:C20–46). |
| Modulus rupture (room temperature). | 2,617 p.s.i. | (ASTM:C133–55). |
| Cold crushing strength | 5,690 p.s.i. | (ASTM:C133–55). |
| Apparent specific gravity | 2.68 | (ASTM:C20–46). |

(The numbers in parentheses indicate the standard test of the American Society for Testing Materials used to measure the property). Upon reheating to 2732° F., the brick showed no change in length and upon reheating to 2910° F., showed a 0.1% increase in length (ASTM C113–61). When heated under a load of 25 p.s.i. at 2640° F., deformation was minus 1.9% (ASTM C16–62).

The products of this invention are useful in lining rotary kilns, building metallurgical furnaces, and, in general, wherever prior cut refractories of similar chemical constitution are used.

It will be understood that the exact composition of a mix within the limits of this invention will depend on the precise chemical constitution of the raw materials used, and the amounts of these raw materials will be chosen to obtain the desired chemical composition of the fired refractory and also to obtain a mix which is workable and which can be dried and fired without excessive breakage and other losses.

In the specification and claims, percentages and parts are by weight (except for porosities, which are given in volume percent) unless otherwise indicated. Mesh sizes referred to herein are Tyler Standard Screen sizes which are defined, for example, in Chemical Engineers' Handbook, John H. Perry, editor-in-chief, 3rd edition, 1950 published by McGraw-Hill Book Company at page 963. Thus, for example, a size passing a 28 mesh screen corresponds to 0.0232 inch or 0.589 mm. and that passing a 200 mesh screen to 0.0029 inch or 0.074 mm. Analyses of mineral components are given in the usual manner, expressed as simple oxides, e.g., $Al_2O_3$, $SiO_2$, although the components may actually be present in various combinations, e.g., as aluminum-silicates. Cone numbers used refer to the Standard Orton pyrometric cones used to measure the combined effect of time and temperature in the firing of ceramic products. Thus, for example, cone 15 represents a heating to 2595° F. (1425° C.) at a rate of 108° F. (60° C.) per hour, which is equivalent to heating to 2608° F. (1430° C.) at a rate of 270° F. (150° C.) per hour.

Having now described the invention, what is claimed is:

1. A refractory composition consisting essentially of at least 30% by weight of plastic clay, at least 10% by weight pulverized, calcined aluminous material containing at least 70% $Al_2O_3$, and at least 5% by weight of lightly calcined flint clay, the balance being raw flint clay.

2. A refractory composition consisting essentially of at least 30% by weight of plastic fireclay, at least 10% by weight of a pulverized, calcined aluminous material containing at least 70% $Al_2O_3$, and at least 20% by weight of lightly calcined flint clay, the balance being raw flint clay.

3. A refractory composition consisting essentially of from 30% to 40% by weight plastic clay, from 10% to 20% by weight of a pulverized, calcined aluminuous material containing at least 70% $Al_2O_3$, the balance being flint clay at least 40% of which is lightly calcined.

4. A refractory composition consisting essentially of from 30% to 40% by weight plastic fireclay, from 10% to 20% by weight pulverized, calcined aluminous material containing at least 70% $Al_2O_3$, from 20% to 30% by weight of lightly calcined flint clay and from 20% to 30% by weight lightly calcined flint clay, and from 5. A refractory composition consisting essentially of from 30% to 40% by weight of plastic fireclay, from 10% to 20% by weight of at least one material chosen from the group consisting of pulverized, calcined bauxite and pulverized, calcined aluminum hydroxide, said chosen material containing at least 70% $Al_2O_3$, from 20% to 30% by weight lightly calcined flint clay, and from 20% to 30% by weight of raw clay.

6. A refractory composition consisting essentially of from 30% to 40% by weight plastic fireclay, from 10% to 20% by weight of pulverized, calcined aluminous material containing at least 70% $Al_2O_3$, from 20% to 30% by weight raw flint clay, and from 20% to 30% by weight of lightly calcined flint clay having an ignition loss of from 2% to 5% by weight.

7. A refractory composition consisting essentially of from 30% to 40% by weight of plastic fireclay, from 10% to 20% by weight calcined aluminous material containing at least 70% $Al_2O_3$ and substantially all passing a 28 mesh screen, from 20% to 30% by weight of lightly calcined flint clay the major portion of which is retained on a 28 mesh screen, and from 20% to 30% by weight of raw flint clay, the major portion of which is retained on a 28 mesh screen.

8. A refractory composition consisting essentially of about 35% plastic fire clay, about 15% pulverized calcined bauxite, about 24% raw flint clay and about 26% lightly calcined flint clay.

9. A refractory composition consisting essentially of about 35% plastic fireclay, about 15% pulverized calcined bauxite, about 24% raw flint clay, and about 26% lightly calcined flint clay having an ignition loss of about 4% by weight.

10. A refractory composition consisting essentially of about 35% plastic fireclay, about 15% calcined bauxite containing at least 70% $Al_2O_3$ substantially all the bauxite passing a 28 mesh screen and the major portion of it passing a 200 mesh screen, about 24% raw flint clay substantially all passing a 5 mesh screen with a major portion being retained on a 28 mesh screen, and about 26% lightly calcined flint clay showing an ignition loss after calcination of about 4% and all passing a 6 mesh screen and 70% retained on a 28 mesh screen.

11. The process of making a refractory shape comprising combining a mixture containing at least 30% by weight plastic clay, at least 10% by weight pulverized, calcined aluminous material containing at least 70% $Al_2O_3$, at least 20% by weight of lightly calcined flint clay, the balance being raw flint clay, with a tempering amount of water, forming said mixture into shapes by a plastic forming operation, and drying and firing said shapes.

12. The process of making a refractory shape comprising combining a mixture containing at least 30% by weight plastic clay, at least 10% by weight pulverized, calcined aluminous material containing at least 70% $Al_2O_3$, at least 5% by weight of lightly calcined flint clay, the balance being raw flint clay, with a tempering amount of water and an organic binder, extruding said mixture in a column, cutting said column into discrete shapes, and drying and firing said shapes.

13. A process according to claim 12 wherein said shapes are subjected to a repress operation before drying.

14. The process of making a refractory shape comprising mixing from 30% to 40% by weight plastic fireclay, from 10% to 20% by weight of a pulverized, calcined aluminous material containing at least 70% $Al_2O_3$, and from 40% to 60% by weight of flint clay, at least 40% of said flint clay being lightly calcined, with a tempering amount of water, extruding the mixture in a column, cutting said column into discrete shapes, and drying and firing said shapes.

15. The process of making a refractory shape comprising mixing from 30% to 40% by weight plastic fireclay, from 10% to 20% by weight of pulverized, calcined bauxite, from 20% to 30% by weight of lightly calcined flint clay, and from 20% to 30% by weight of raw flint clay with a tempering amount of water, extruding said mixture in a column, cutting said column to form discrete units, repressing said units, and drying and firing said units.

16. A process according to claim 15 wherein said units are fired to at least cone 14.

17. A process according to claim 16 wherein said firing takes place at from about cone 14 to about cone 16.

18. The process of making a refractory shape comprising mixing 30% to 40% by weight plastic fireclay, from 10% to 20% by weight of pulverized calcined bauxite containing at least 70% $Al_2O_3$, from 20% to 30% by weight of lightly calcined flint clay having an ignition loss of from 2% to 5%, and from 20% to 30% by weight of raw flint clay with a tempering amount of water, extruding said mixture in a column, cutting said column to form discrete units, and drying and firing said units.

19. The process according to claim 18 wherein said units are subjected to a repressing before drying.

20. The method of making a refractory shape comprising mixing about 35% plastic fireclay, about 15% pulverized calcined bauxite containing at least 85% $Al_2O_3$, substantially all of which passes a 28 mesh screen, about 24% raw flint clay the major portion of which is retained on a 28 mesh screen, and about 26% lightly calcined flint clay having an ignition loss of about 4%, at least 50% of which is retained on a 28 mesh screen, with a tempering amount of water, extruding said mixture in a column, cutting said column to form discrete units, and drying and firing said units.

21. A fired alumino-silicate refractory formed from a composition consisting essentially of at least 30% by weight of plastic clay, at least 10% by weight pulverized, calcined aluminous material containing at least 70% $Al_2O_3$, and at least 5% by weight of lightly calcined flint clay, the balance being raw flint clay, said refractory in fired condition having an $Al_2O_3$ content of at least 47.5% $Al_2O_3$, the major portion of the balance being $SiO_2$ and the remainder normal impurities, said fired refractory having a porosity not greater than 15%.

22. A fired alumino-silicate refractory formed from a composition consisting essentially of from 30% to 40% by weight plastic clay, from 10% to 20% by weight pulverized, calcined aluminous material containing at least 70% $Al_2O_3$, the balance being flint clay at least 40% of which is lightly calcined, said refractory in fired condition having an $Al_2O_3$ content of from 47.5% to 52.5%, the major portion of the balance being $SiO_2$ and the remainder impurities in normal amounts, said fired refractory having a porosity not greater than 10%.

23. A fired alumino-silicate refractory formed from a composition consisting essentially of from 30% to 40% by weight plastic fire clay, from 10% to 20% by weight pulverized, calcined aluminous material containing at least 70% $Al_2O_3$, from 20% to 30% by weight lightly calcined flint clay, and from 20% to 30% by weight raw flint clay, said refractory in fired condition having an $Al_2O_3$ content of from 47.5% to 52.5%, an $SiO_2$ content of from 42.5% to 47.5%, the balance being normal impurities, said refractory having a porosity not greater than 15%.

24. A fired alumino-silicate refractory according to claim 23 having a porosity not greater than 10%.

References Cited by the Examiner
UNITED STATES PATENTS
2,704,419   3/1955   Hewitt et al. _____ 106—65

TOBIAS E. LEVOW, *Primary Examiner.*

J. E. POER, *Assistant Examiner.*

UNITED STATES PATENT OFFICE
CERTIFICATE OF CORRECTION

Patent No. 3,243,306                              March 29, 1966

Frank F. Raine

It is hereby certified that error appears in the above numbered patent requiring correction and that the said Letters Patent should read as corrected below.

Column 3, line 36, for "caly" read -- clay --; line 38, for "Missouir" read -- Missouri --; line 53, for "in" read -- is --; column 4, line 55, strike out "lightly calcined" and insert instead -- of raw --; same line 55, for "clay, and from" read -- clay. --.

Signed and sealed this 1st day of August 1967.

(SEAL)
Attest:

Edward M. Fletcher, Jr.                                    EDWARD J. BRENNER
Attesting Officer                                               Commissioner of Patents